(12) United States Patent
Sebire et al.

(10) Patent No.: US 12,490,268 B2
(45) Date of Patent: Dec. 2, 2025

(54) SCHEDULING REQUEST MANAGEMENT

(71) Applicant: Nokia Technologies Oy, Espoo (FI)

(72) Inventors: Benoist Sebire, Tokyo (JP); Chunli Wu, Beijing (CN); Samuli Turtinen, Ii (FI)

(73) Assignee: NOKIA TECHNOLOGIES OY, Espoo (FI)

(*) Notice: Subject to any disclaimer, the term of this patent is extended or adjusted under 35 U.S.C. 154(b) by 429 days.

(21) Appl. No.: 17/924,439

(22) PCT Filed: May 21, 2020

(86) PCT No.: PCT/CN2020/091568
§ 371 (c)(1),
(2) Date: Nov. 10, 2022

(87) PCT Pub. No.: WO2021/232354
PCT Pub. Date: Nov. 25, 2021

(65) Prior Publication Data
US 2023/0180241 A1   Jun. 8, 2023

(51) Int. Cl.
H04W 72/21       (2023.01)
H04W 72/1268     (2023.01)
(Continued)

(52) U.S. Cl.
CPC ....... H04W 72/21 (2023.01); H04W 72/1268 (2013.01); H04W 72/566 (2023.01); H04W 74/0808 (2013.01)

(58) Field of Classification Search
None
See application file for complete search history.

(56) References Cited

U.S. PATENT DOCUMENTS

2018/0324844 A1   11/2018   Babaei et al.
2019/0150024 A1   5/2019    Ye et al.
(Continued)

FOREIGN PATENT DOCUMENTS

CN   108810975 A   11/2018
CN   109788572 A   5/2019
(Continued)

OTHER PUBLICATIONS

Office Action received for corresponding Chinese Patent Application No. 202080101013.1, dated Mar. 20, 2024, 13 pages of Office Action and English translation, 11 pages, total 24 pages.
(Continued)

Primary Examiner — Anh Ngoc M Nguyen
(74) Attorney, Agent, or Firm — Carter, DeLuca & Farrell LLP

(57) ABSTRACT

Example embodiments of the present disclosure relate to apparatus, method and computer readable storage media of scheduling request management. The method includes in accordance with a determination that data on a logical channel is available for transmission, determining, at an apparatus, whether there is pending data available for transmission on one or more further logical channels; and in accordance with a determination that there is pending data available for transmission, determining a set of target scheduling request, SR, configurations available for a SR procedure from a plurality of candidate SR configurations associated with the logical channel and the one or more further logical channels; and performing the SR procedure based on the target SR configuration. In this way, the waste of the SR configurations can be avoided and the SR may be transmitted using the fastest SR opportunity.

2 Claims, 4 Drawing Sheets

(51) Int. Cl.
*H04W 72/566* (2023.01)
*H04W 74/0808* (2024.01)

(56) References Cited

U.S. PATENT DOCUMENTS

2020/0084790 A1  3/2020  Wang et al.
2022/0123822 A1* 4/2022  Shi .................. H04W 76/19

FOREIGN PATENT DOCUMENTS

| CN | 110366260 A | 10/2019 |
| EP | 3413672 A2 | 12/2018 |
| WO | 2017/074437 A1 | 5/2017 |
| WO | WO 2017/150828 A1 | 9/2017 |
| WO | 2019/028884 A1 | 2/2019 |
| WO | 2019/075762 A1 | 4/2019 |

OTHER PUBLICATIONS

"Email discussion summary on [99bis#38][NR UP/MAC]—SR open issues", 3GPP TSG-RAN WG2 #100, R2-1712973, Agenda item: 10.3.1.5, Nokia, Nov. 27-Dec. 1, 2017, 49 pages.

Huawei et al., "Correction on BSR triggered SR," 3GPP TSG-RAN WG2 #104 Meeting, R2-1818773, Spokane, USA, Nov. 12-16, 2018.

CATT et al., "BSR trigger issue for CA duplication," 3GPP TSG-RAN WG2#102, R2-1807006, Busan, Korea, May 21-25, 2018.

CATT et al., "BSR trigger issue for CA duplication," 3GPP TSG-RAN WG2 Meeting #107bis, R2-1912222, Chongqing, P.R. China, Oct. 14-18, 2019.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

International Search Report and Written Opinion received for corresponding Patent Cooperation Treaty Application No. PCT/CN2020/091568, dated Feb. 22, 2021, 9 pages.

"Multiple SR Configurations", 3GPP TSG-RAN WG2 Meeting #110e, R2-2004516, Agenda: 6.20.2.2, Nokia, Jun. 1-12, 2020, 3 pages.

Extended European Search Report received for corresponding European Patent Application No. 20936880.2, dated Dec. 18, 2023, 11 pages.

"Support of multiple SR configurations", 3GPP TSG-RAN2 Meeting #NR_AHs, R2-1706900, Agenda: 10.3.1.5, Huawei, Jun. 27-29, 2017, 5 pages.

"SR triggering for multiple pending BSRs", 3GPP TSG-RAN WG2 Meeting 106, R2-1907770, Agenda: 11.7.2.2, Huawei, May 13-17, 2019, 2 pages.

"SR configuration reuse under LCH release", 3GPP TSG-RAN WG2#100, R2-1712267, Agenda: 10.3.1.5, Spreadtrum Communications, Nov. 27-Dec. 1, 2017, 2 pages.

* cited by examiner

SCHEDULING REQUEST MANAGEMENT

CROSS REFERENCE TO RELATED APPLICATION

This patent application is a U.S. National Stage application of International Patent Application Number PCT/CN2020/091568 filed May 21, 2020, which is hereby incorporated by reference in its entirety.

FIELD

Embodiments of the present disclosure generally relate to the field of telecommunication and in particular, to apparatus, methods and computer readable storage media of Scheduling Request (SR) management.

BACKGROUND

When new data arrives in User Equipment (UE) buffers, a Buffer Status Report (BSR) may be triggered to indicate, for example, a size of uplink (UL) data to be transmitted. If no UL resources are available for transmitting the BSR, a SR may be triggered to request an UL grant.

Each Logical Channel (LCH) may be pre-configured with a SR configuration. Each SR configuration consists of a set of PUCCH resources tied to a numerology, BWP and cell and which SR resource to be used depends on the LCH that triggered the BSR. It has been proposed to allow multiple SR configurations to be used for a SR procedure initiated by data arrival on a LCH configured with a Logical Channel Group (LCG).

With multiple SR, it becomes possible to reserve more SR opportunities e.g. for Ultra-Reliable and Low Latency Communications (URLLC) services and identify the LCH(s) requesting resources directly from the SR used to request them.

SUMMARY

In general, example embodiments of the present disclosure provide a solution of scheduling request management.

In a first aspect, there is provided an apparatus. The apparatus comprises at least one processor; and at least one memory including computer program codes; the at least one memory and the computer program codes are configured to, with the at least one processor, cause the apparatus at least to in accordance with a determination that data on a logical channel is available for transmission, determine whether there is pending data available for transmission on one or more further logical channels; in accordance with a determination that there is pending data available for transmission, determine a set of target scheduling request, SR, configurations available for a SR procedure from a plurality of candidate SR configurations associated with the logical channel and the one or more further logical channels and perform the SR procedure based on the target SR configuration.

In a second aspect, there is provided a method. The method comprises in accordance with a determination that data on a logical channel is available for transmission, determining, at an apparatus, whether there is pending data available for transmission on one or more further logical channels; and in accordance with a determination that there is pending data available for transmission, determining a set of target scheduling request, SR, configurations available for a SR procedure from a plurality of candidate SR configurations associated with the logical channel and the one or more further logical channels; and performing the SR procedure based on the target SR configuration.

In a third aspect, there is provided an apparatus comprises means for in accordance with a determination that data on a logical channel is available for transmission, determining, at an apparatus, whether there is pending data available for transmission on one or more further logical channels; and means for in accordance with a determination that there is pending data available for transmission, determining a set of target scheduling request, SR, configurations available for a SR procedure from a plurality of candidate SR configurations associated with the logical channel and the one or more further logical channels; and means for performing the SR procedure based on the target SR configuration.

In a fourth aspect, there is provided a computer readable medium having a computer program stored thereon which, when executed by at least one processor of a device, causes the device to carry out the method according to the third aspect or a fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
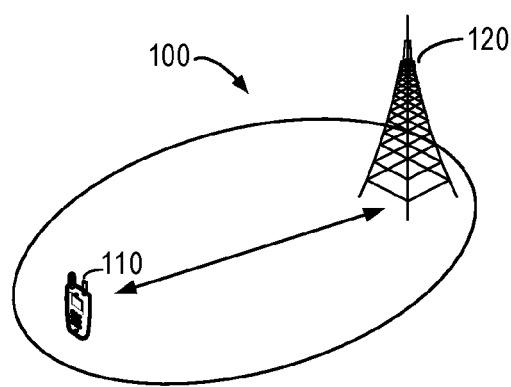
FIG. 1 shows an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 comprises a terminal device 110 (hereafter also referred to as an apparatus 110 or a UE 110) and a network device 120 (hereafter also referred to as a further apparatus 120 or a gNB 120). The terminal device 110 may communicate with the network device 120. It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, when new data arrives in User Equipment (UE) buffers, a Buffer Status Report (BSR) may be triggered to indicate, for example, a size of uplink (UL) data to be transmitted. If no UL resources are available for transmitting the BSR, a Scheduling Request (SR) may be triggered to request a UL grant.

Each Logical Channel (LCH) may be pre-configured with a SR configuration. Each SR configuration consists of a set of PUCCH resources tied to a numerology, BWP and cell and which SR resource to be used depends on the LCH that triggered the BSR. It has been proposed to allow multiple SR configurations to be used for a SR procedure initiated by data arrival on a LCH configured with a Logical Channel Group (LCG).

It is to be understood that "configured with LCG" is always assumed throughout the present disclosure. In other words, logical channels without an LCG configured are not considered.

With multiple SR, it becomes possible to reserve more SR opportunities e.g. for Ultra-Reliable and Low Latency Communications (URLLC) services and identify the LCH(s) requesting resources directly from the SR used to request them.

In a conventional way, only the SR of the logical channel with the highest priority is used. If data on a further logical channel with lower priority reaches the UE buffers, a different SR configuration associated with the further logical channel with lower priority cannot be used. Also, if data on a further logical channel with equally high priority reaches the UE buffers, a different SR configuration associated with the further logical channel with equally high priority cannot be used, because no further BSR for this further logical channel is triggered.

As result, in a scenario of URLLC or Industrial Internet Of Things (IIOT), more services may be supported. The current mechanism for SR may cause latency due to a restriction of the priority of the logical channels and the SR configuration.

It has been agreed that if data on several logical channels with equally high priority reaches the UE buffers one after another, only one BSR is triggered and only the SR configuration of the logical channel on which the data first reaches the UE buffer can be used. Thus, some SR configuration may be wasted and the SR for high priority data may be delayed.

Therefore, the embodiments of the present disclosure propose a solution of SR management. In this solution, multiple SR configurations associated with LCHs containing available UL data may be considered as a set of target SR configurations for transmitting a SR. In this way, the waste of the SR configurations can be avoided and the SR may be transmitted using the fastest SR opportunity.

Principle and implementations of the present disclosure will be described in detail below with reference to FIGS. 2-3.

Figure 2:
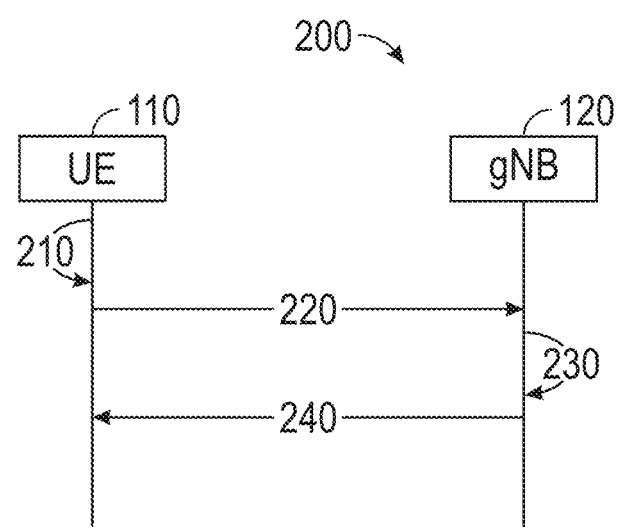
FIG. 2 shows a signaling chart illustrating a process of scheduling request management according to some example embodiments of the present disclosure.

FIG. 2 shows a signaling chart illustrating a process of scheduling request management according to some example embodiments of the present disclosure. For the purpose of discussion, the process 200 will be described with reference to FIG. 1. The process 200 may involve the UE 110 and the gNB 120 as illustrated in FIG. 1. It would be appreciated that although the process 200 has been described in the communication network 100 of FIG. 1, this process may be likewise applied to other communication scenarios.

When new data becomes available for a logical channel, the UE 110 may determine whether a BSR associated with this logical channel is triggered and transmit a SR based on a SR configuration associated with this logical channel.

If the UE 110 determines there is pending data on one or more further logical channels available for transmission, the SR configurations configured for the one or more further logical channels may also be considered to be used for the transmission of the SR, because the SR resources indicated in these SR configurations are anyway dedicated to the UE 110.

Thus, for transmitting a SR, the UE 110 may determine 210 a set of target SR configurations for a SR procedure. Based on the set of target SR configurations, the UE 110 may select available resource for transmitting the SR.

For example, the SR configuration selection may depend on a priority of a logical channel on which the new data arrives and the respective further priorities of one or more further logical channels on which there is pending data.

In some example embodiments, if the priority of a logical channel on which the new data arrives is higher than the respective further priorities of the one or more further logical channels, when the new data is coming, a BSR may be triggered. The UE 110 may determine multiple SR configurations associated with all logical channels containing the UL available data, i.e. the logical channel on which the new data arrives and the one or more further logical channels having the pending data as the set of target SR configurations for transmitting the SR.

In some example embodiments, if the priority of a logical channel on which the new data arrives is equal to a further priority of a further logical channel in the one or more further logical channels, when the new data is coming, a BSR may not be triggered. The UE 110 may determine whether a SR procedure for sending the BSR triggered by the further logical channel is on-going.

If the UE 110 determines that a SR procedure for sending the BSR triggered by the further logical channel is on-going, the UE may add the SR configuration configured for the logical channel to the current SR configuration for the on-going scheduling request procedure. For example, if the current SR configuration for the on-going scheduling request procedure comprises the SR configuration configured for the further logical channel for which a BSR is triggered, the new set of SR configurations for the on-going scheduling request procedure may comprise the SR configuration configured for the logical channel and the SR configuration configured for the further logical channel.

As another option, if the priority of a logical channel on which the new data arrives is equal to a further priority of a further logical channel in the one or more further logical channels and a BSR associated with the further logical channel has been triggered, the UE may add multiple SR configurations configured for all other logical channel containing the UL available data. Thus, the new set of SR configurations for the on-going scheduling request procedure may comprise the SR configuration configured for the logical channel and respective further SR configurations configured for one or more further logical channels.

Similarly, if the priority of a logical channel on which the new data arrives is lower than a further priority of a further logical channel in the one or more further logical channels, when the new data is coming, a BSR may not be triggered. The UE 110 may also determine whether a SR procedure for sending the BSR triggered by the further logical channel is on-going.

If the UE 110 determines that a SR procedure for sending the BSR triggered by the further logical channel is on-going, the UE may add the SR configuration configured for the logical channel to the current SR configuration for the on-going scheduling request procedure. For example, if the current SR configuration for the on-going scheduling request procedure comprises the SR configuration configured for the further logical channel on which a BSR is triggered, the new set of SR configurations for the on-going scheduling request procedure may comprise the SR configuration configured for the logical channel and the SR configuration configured for the further logical channel.

In some example embodiments, the SR configurations configured for the logical channel with new data arrival or the one or more further logical channels with data available for transmission are added to the ongoing SR procedure as SR configurations for SR transmission. In some other example embodiments, additional SR(s) may be triggered for the logical channel with new data arrival or for the all logical channels with data available for transmission, with or without new BSR triggered.

In some example embodiments, when a BSR is transmitted in a MAC PDU by the UE 110, all the pending SRs may be cancelled. For example, all the pending SRs may be cancelled and each respective sr-ProhibitTimer (associated with the SR configuration corresponding to the pending SR) may be stopped when a MAC PDU is transmitted and this PDU includes a Long or Short BSR MAC CE which contains buffer status up to (and including) the last event that triggered a BSR prior to the MAC PDU assembly. Then, for example, all the pending SRs with or without new BSR trigger may be cancelled.

An example may be described as follow to clarify the implementation of SR configuration selection.

Assuming that the UE 110 may be configured with LCH1 with priority 1 and SR resource configuration 1 (hereinafter may be referred to as SR1), LCH2 with priority 2 and SR resource configuration 2 (hereinafter may be referred to as SR2) and LCH3 with priority 2 and SR resource configuration 3 (hereinafter may be referred to as SR3), and LCH4 with priority 3 and SR resource configuration 4 (hereinafter may be referred to as SR4). The priority 1 is the highest priority.

It is to be understood that even though LCH3 is with same priority as LCH2, but they have different LCP mapping restriction so would need to require different SR resource.

In some example embodiments, if LCH1 has new data arrival when there is already data in the buffer for LCH2 with the lower priority and LCH4 with lower priority, SR1, SR2, SR4 may be used for all the LCHs with data available for transmission as resources to be used to transmitting the SR.

In some example embodiments, if LCH3 has new data arrival when there is already data in the buffer for LCH2 with the same priority and LCH4 with lower priority and if there is already an SR pending for LCH2, as an option, SR3 may also be added to the SR configuration for the pending SR procedure. As another option, both SR3 and SR4 may be added to the SR configuration for the pending SR procedure. That is, the SR may be transmitted using resources associated with SR2, SR3 and SR4.

In some example embodiments, if LCH4 has new data arrival when there is already data in the buffer for LCH2 with a higher priority, and if there is already an SR pending for LCH2, SR4 may also be added to the SR configuration for the pending SR procedure. That is, the SR may be transmitted using resources associated with SR2 and SR4.

In some example embodiments, the additional SR configurations can be added into the pool of SR configurations only when the UE has triggered at least one BSR and SR that are pending. If there's no SR pending, adding resources have no effect.

In some example embodiments, the additional SR configurations (the ones added without BSR trigger according to the rules above) could be up to UE implementation to take advantage of. In other words, the UE is not mandated to signal SR in each valid SR configuration added to the SR configurations pool, unless it is the one with the valid BSR trigger. Naturally, the SR configurations corresponding to LCH not having data should remain unused.

In some example embodiments, a logical channel priority threshold may be configured or pre-configured for the UE 110 to control logical channel priority is allowed to add SR configurations. Such a priority threshold could be an absolute priority threshold or alternatively relative to the priority of the highest priority LCH containing data available for transmission. The logical channel priority threshold may be transmitted to the UE 110 via a higher layer signalling, for example, a RRC signalling.

In some example embodiments, if the priority of a logical channel on which the new data arrives is higher than the respective further priorities of the one or more further logical channels, besides the SR configuration configured for the logical channel on which the new data arrives, the UE 110 may also determine a set of SR configurations from candidate SR configurations associated with all logical channels containing the UL available data based on the logical channel priority threshold. That is, if the respective further priorities of a portion of further logical channels in the one or more further logical channels are not lower than the logical channel priority threshold, the set of SR configurations configured for the portion of further logical channels and the SR configuration configured for the logical channel on which the new data arrives may be used for transmitting the SR.

In some example embodiments, if the priority of a logical channel on which the new data arrives is equal to or lower than a further priority of a further logical channel in the one or more further logical channels, and if the BSR associated with the further logical channel has been triggered, the UE 110 may determine whether the priority of logical channel on which the new data arrives or the remaining further logical channels in one or more logical channels other than the further logical channel matches the logical channel priority threshold. If the priority of logical channel on which the new data arrives is not lower than the logical channel priority threshold, the SR configuration configured for the logical channel may be added to the current SR configuration of the on-going SR procedure. If a further logical channel in the remaining further logical channels is not lower than the logical channel priority threshold, the SR configuration configured for the further logical channel may be added to the current SR configuration of the on-going SR procedure.

After determining the SR configuration, the UE 110 may transmit 220 the SR to the gNB 120 using available resources based on the determined a set of target SR configurations. Then the gNB may allocate 230 UL resources for the UE 110 for the UL transmission and transmit 240 the UL grant to the UE 110.

In some example embodiments, whenever there is overlapping valid PUCCH resources to signal SR from the pool of SR configurations, the PUCCH resource for the SR configuration with the valid BSR trigger is prioritized.

For example, a first SR configuration and as second SR configuration are used to transmit a SR. In a case where a first available resources of a first SR configuration configured for a first logical channel and a second available resources of a second SR configuration configured for a second logical channel are overlapped in a time-domain, the UE 110 may determine the current SR procedure is triggered by which logical channel.

If the current SR procedure is triggered by the first logical channel, the first available resources may be determined as the available resources for transmitting the SR.

Similarly, instead of using the priority of the logical channel as a criteria to determine whether an SR configuration can be considered or not, the amount of data buffered, power headroom, serving cell or active BWP could be used as a criteria.

In this way, the waste of the SR configurations can be avoided and the SR may be transmitted using the fastest SR opportunity.

Figure 3:
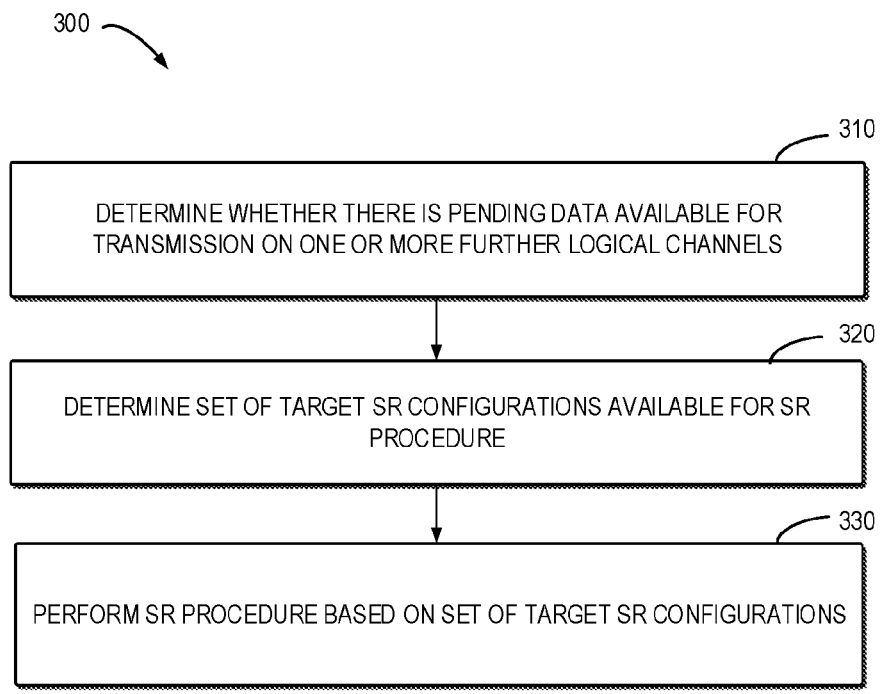
FIG. 3 shows a flowchart of an example method of scheduling request management according to some example embodiments of the present disclosure.

FIG. 3 shows a flowchart of an example method 300 of scheduling request management according to some example embodiments of the present disclosure. The method 300 can be implemented at the apparatus 110 as shown in FIG. 1. For the purpose of discussion, the method 300 will be described with reference to FIG. 1.

As shown in FIG. 3, at 310, if the apparatus determines data on a logical channel is available for transmission, the apparatus determine whether there is pending data available for transmission on one or more further logical channels.

At 320, if the apparatus determines there is pending data available for transmission, the apparatus determine a set of target scheduling request, SR, configurations available for a SR procedure from a plurality of candidate SR configurations associated with the logical channel and the one or more further logical channels.

In some example embodiments, the apparatus may determine a priority of the logical channel and respective further priorities of the one or more further logical channels. If the apparatus determines the priority exceeds the respective further priorities, the apparatus may determine a candidate SR configuration for the logical channel and respective further candidate SR configurations for the one or more further logical channels as the set of target SR configurations.

In some example embodiments, the apparatus may determine a priority of the logical channel and respective further priorities of the one or more further logical channels. If the apparatus determines the priority exceeds the respective further priorities, the apparatus may obtain a threshold logical channel priority. The apparatus may further determine a candidate SR configuration for the logical channel and a further candidate SR configuration for the first further logical channel as the set of target SR configurations, if the apparatus determines a first further priority of a first further logical channel in the one or more further logical channels is not lower than the threshold logical channel priority.

In some example embodiments, the apparatus may determine a priority of the logical channel and respective further priorities of the one or more further logical channels. If the apparatus determines the priority does not exceed a first further priority of a first further logical channel in the one or more further logical channels, the apparatus may determining whether the SR procedure triggered by the first further logical channel is ongoing. If the apparatus determines the SR procedure is ongoing, the apparatus may determine a candidate SR configuration for the logical channel and a further candidate SR configuration for the first further logical channel as the set of target SR configurations.

In some example embodiments, the apparatus may determine a priority of the logical channel and respective further priorities of the one or more further logical channels. If the apparatus determines the priority does not exceed a first further priority of a first further logical channel in the one or more further logical channels, the apparatus may determining whether the SR procedure triggered by the first further logical channel is ongoing. If the apparatus determines the SR procedure is ongoing, the apparatus may determine a candidate SR configuration for the logical channel and respective further candidate SR configurations for the one or more further logical channels as the set of target SR configurations.

In some example embodiments, the apparatus may determine a priority of the logical channel and respective further priorities of the one or more further logical channels. If the apparatus determines the priority does not exceed a first further priority of a first further logical channel in the one or more further logical channels, the apparatus may determining whether the SR procedure triggered by the first further logical channel is ongoing. If the apparatus determines the SR procedure is ongoing, the apparatus may obtain a threshold logical channel priority. If the apparatus determines the priority of the logical channel is not lower than the threshold logical channel priority, the apparatus may determine a candidate SR configuration for the logical channel and a further candidate SR configuration for the first further logical channel as the set of target SR configurations.

In some example embodiments, if the apparatus determines a second further priority of a second further logical channel in the one or more further logical channels is not lower than the threshold logical channel priority, the apparatus may determine a candidate SR configuration for the logical channel and respective further candidate SR configurations for the first further logical channel and the second further logical channel as the set of target SR configurations.

At 330, the apparatus performs the SR procedure based on the target SR configuration.

In some example embodiments, the apparatus may obtain a set of candidate SR resources configured in the set of target SR configuration and select a target SR resource for the SR procedure from the set of candidate SR resources.

In some example embodiments, if apparatus determines a first subset of candidate SR resources and a second subset of candidate SR resources in the set of candidate SR resources are in a same time-domain, the apparatus may determine a target logical channel by which the SR is triggered from the logical channel and the first further logical channel and select the target SR resource from the first subset of candidate SR resources and the second subset of candidate SR resources based on the target logical channel.

In some example embodiments, an apparatus capable of performing the method 300 (for example, implemented at the apparatus 110) may comprise means for performing the respective steps of the method 300. The means may be implemented in any suitable form. For example, the means may be implemented in a circuitry or software module.

In some example embodiments, the apparatus comprises means for in accordance with a determination that data on a logical channel is available for transmission, determining whether there is pending data available for transmission on one or more further logical channels; and means for in accordance with a determination that there is pending data available for transmission, determining a set of target scheduling request, SR, configurations available for a SR procedure from a plurality of candidate SR configurations associated with the logical channel and the one or more further logical channels; and means for performing the SR procedure based on the target SR configuration.

Figure 4:
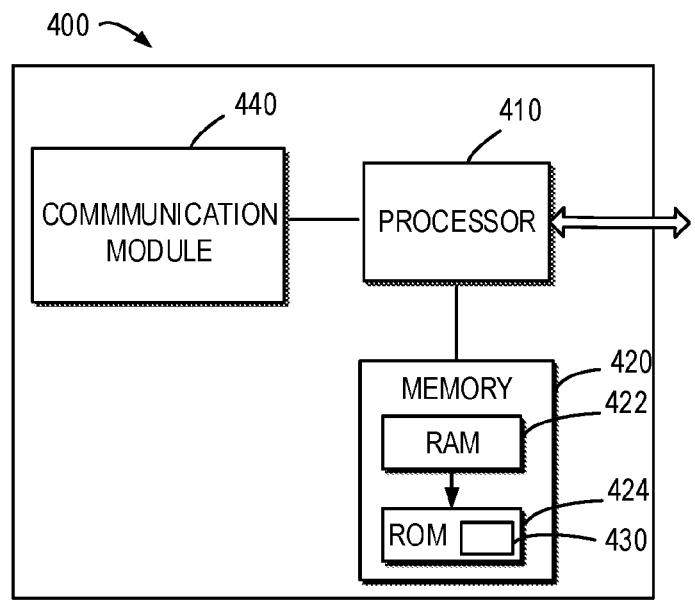
FIG. 4 shows a simplified block diagram of a device that is suitable for implementing example embodiments of the present disclosure.

FIG. 4 is a simplified block diagram of a device 400 that is suitable for implementing embodiments of the present disclosure. The device 400 may be provided to implement the communication device, for example the apparatus 110 as shown in FIG. 1. As shown, the device 400 includes one or more processors 410, one or more memories 440 coupled to the processor 410, and one or more transmitters and/or receivers (TX/RX) 440 coupled to the processor 410.

The TX/RX 440 is for bidirectional communications. The TX/RX 440 has at least one antenna to facilitate communication. The communication interface may represent any interface that is necessary for communication with other network elements.

The processor 410 may be of any type suitable to the local technical network and may include one or more of the following: general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The memory 420 may include one or more non-volatile memories and one or more volatile memories. Examples of the non-volatile memories include, but are not limited to, a Read Only Memory (ROM) 424, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 422 and other volatile memories that will not last in the power-down duration.

A computer program 430 includes computer executable instructions that are executed by the associated processor 410. The program 430 may be stored in the ROM 420. The processor 410 may perform any suitable actions and processing by loading the program 430 into the RAM 420.

The embodiments of the present disclosure may be implemented by means of the program 430 so that the device 400 may perform any process of the disclosure as discussed with reference to FIGS. 2-3. The embodiments of the present disclosure may also be implemented by hardware or by a combination of software and hardware.

Figure 5:
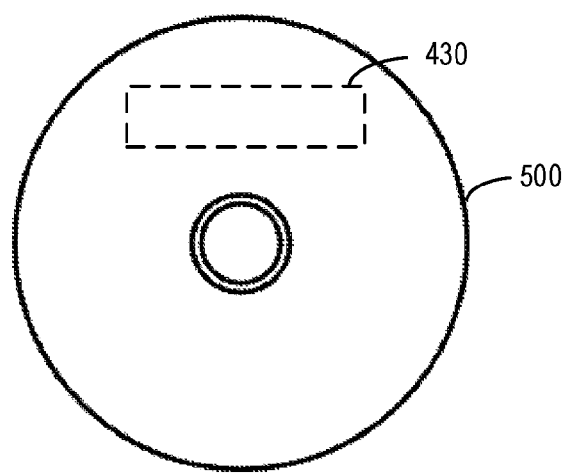
FIG. 5 shows a block diagram of an example computer readable medium in accordance with some embodiments of the present disclosure.

In some embodiments, the program 430 may be tangibly contained in a computer readable medium which may be included in the device 400 (such as in the memory 420) or other storage devices that are accessible by the device 400. The device 400 may load the program 430 from the computer readable medium to the RAM 422 for execution. The computer readable medium may include any types of tangible non-volatile storage, such as ROM, EPROM, a flash memory, a hard disk, CD, DVD, and the like. FIG. 5 shows an example of the computer readable medium 500 in form of CD or DVD. The computer readable medium has the program 430 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one non-transitory memory storing instructions that, when executed with the at least one processor, cause the apparatus to:
   in accordance with a determination that data on a logical channel is available for transmission, determine whether there is pending data available for transmission on one or more further logical channels; and
   in accordance with a determination that there is pending data available for transmission, determine a set of target scheduling request configurations available for a scheduling request procedure from a plurality of candidate scheduling request configurations associated with the logical channel and the one or more further logical channels; and
   perform the scheduling request procedure based on the set of target scheduling request configurations; and
   wherein the instructions, when executed with the at least one processor, are configured to cause the apparatus to determine the set of target scheduling request configuration with:
   determining a priority of the logical channel and respective further priorities of the one or more further logical channels; and
   in accordance with a determination that the priority exceeds the respective further priorities, determining a candidate scheduling request configuration for the logical channel and respective further candidate scheduling request configurations for the one or more further logical channels as the set of target scheduling request configurations.

2. A method comprising:
   in accordance with a determination that data on a logical channel is available for transmission, determining, at an apparatus, whether there is pending data available for transmission on one or more further logical channels; and
   in accordance with a determination that there is pending data available for transmission, determining a set of target scheduling request configurations available for a scheduling request procedure from a plurality of candidate scheduling request configurations associated with the logical channel and the one or more further logical channels; and
   performing the scheduling request procedure based on the set of target scheduling request configurations and;
   wherein determining the set of target scheduling request configuration comprises:
   determining a priority of the logical channel and respective further priorities of the one or more further logical channels; and
   in accordance with a determination that the priority exceeds the respective further priorities, determining a candidate scheduling request configuration for the logical channel and respective further candidate scheduling request configurations for the one or more further logical channels as the set of target scheduling request configurations.

* * * * *